United States Patent
Yoshihara et al.

(10) Patent No.: US 7,103,036 B2
(45) Date of Patent: Sep. 5, 2006

(54) VOICE DATA RELAY APPARATUS

(75) Inventors: Toru Yoshihara, Koriyama (JP);
Shinya Suzuki, Koriyama (JP);
Kimitoshi Takeuchi, Koriyama (JP)

(73) Assignee: Hitachi Telecom Technologies, Ltd.,
Koriyama (JP)

( * ) Notice: Subject to any disclaimer, the term of this patent is extended or adjusted under 35 U.S.C. 154(b) by 956 days.

(21) Appl. No.: 09/820,949

(22) Filed: Mar. 30, 2001

(65) Prior Publication Data

US 2002/0141415 A1 Oct. 3, 2002

(51) Int. Cl.
*H04L 12/66* (2006.01)
*H04L 12/28* (2006.01)

(52) U.S. Cl. .................. 370/356; 370/395.61
(58) Field of Classification Search .................. 370/352,
370/356, 395.1, 395.61, 465, 466, 473, 474
See application file for complete search history.

(56) References Cited

U.S. PATENT DOCUMENTS

| | | | | |
|---|---|---|---|---|
| 5,249,185 A | * | 9/1993 | Kanno et al. | 370/465 |
| 5,757,775 A | * | 5/1998 | Yokoyama et al. | 370/242 |
| 6,038,237 A | * | 3/2000 | Tsuruta et al. | 370/468 |
| 6,075,798 A | * | 6/2000 | Lyons et al. | 370/474 |
| 6,345,054 B1 | * | 2/2002 | Sasaki | 370/465 |

* cited by examiner

*Primary Examiner*—Chau Nguyen
*Assistant Examiner*—Andrew Wahba
(74) *Attorney, Agent, or Firm*—Mattingly, Stanger, Malur & Brundidge, P.C.

(57) ABSTRACT

When a communication system is constructed by use of a plurality of data relay apparatuses of the present invention, it is possible to control an execution/non-execution of a compression/decompression for voice data so that the compression/decompression is not repeatedly executed regardless of a PBX. An ATM multiplexer sends out a transmission pattern to an apparatus adjacent to the ATM multiplexer via a PBX, and stops the compression/decompression of the voice data to relay the voice data transmissively, only when the ATM multiplexer receives the transmission pattern from the adjacent apparatus via the PBX. In other cases, the ATM multiplexer relays the voice data while executing the compression/decompression operation for the voice data.

6 Claims, 3 Drawing Sheets

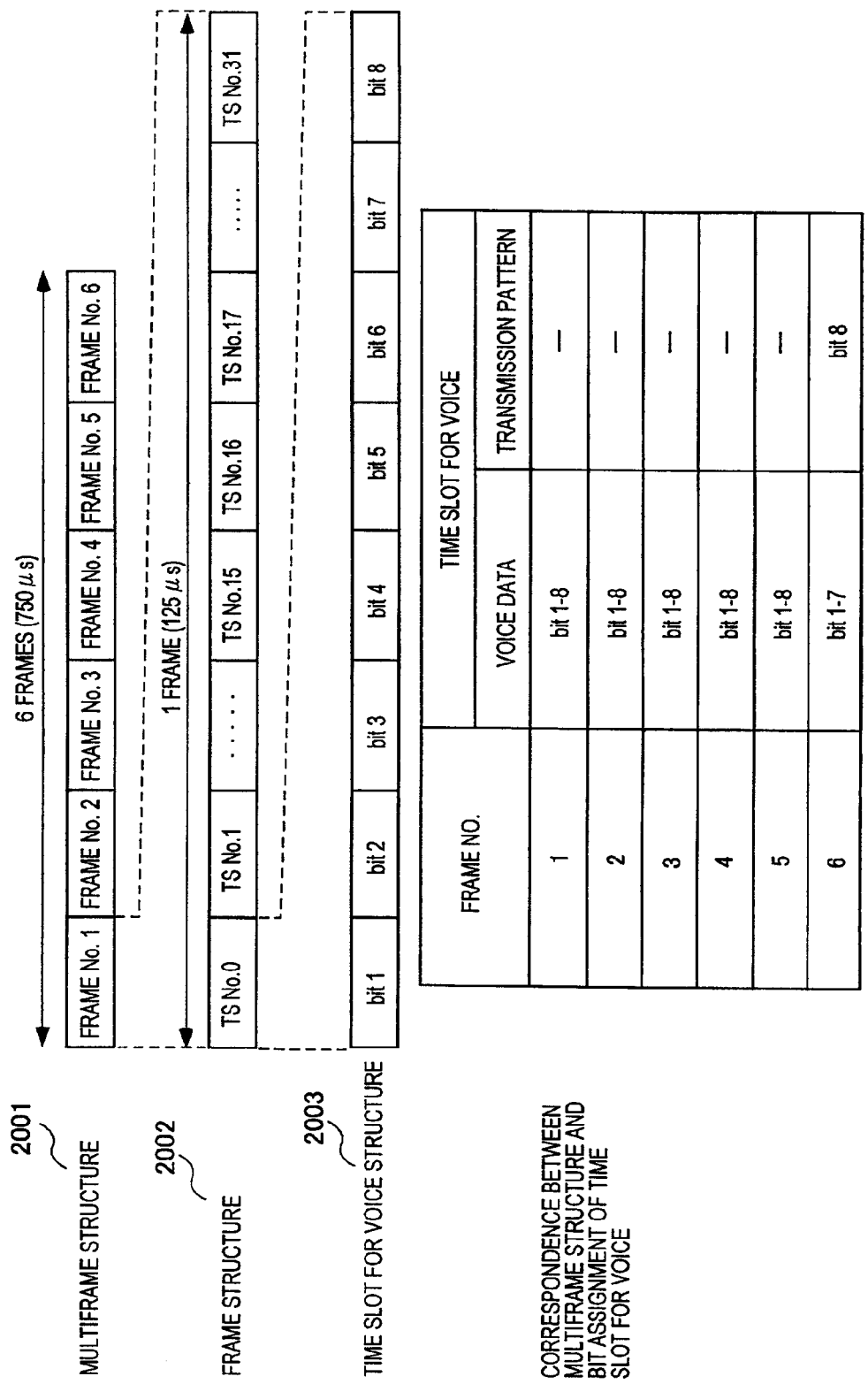

VOICE DATA RELAY APPARATUS

BACKGROUND OF THE INVENTION

The present invention relates to a data relay apparatus for processing and restoring data to relay it from a communication device to another, more particularly to a voice data relay apparatus for compressing and decompressing voice data to relay it from a communication device to another.

An asynchronous transfer mode (hereinafter referred to as ATM) multiplexer which relays a voice call by use of an ATM network has been known as a relay apparatus for relaying voice data to a communication apparatus including a private branch exchange (hereinafter referred to as PBX) and the like. In such an ATM multiplexer, voice data to be relayed is compressed/decompressed so that a voice is compressed to be transmitted on the ATM network.

For example, a consideration is given to a case in which an ATM multiplexer $c330_1$ and an ATM multiplexer $d330_2$ perform relaying of a voice call between a PBX $b320_1$ and a PBX $e320_2$ in FIG. 3A.

As to a direction in which voice data tends from the PBX $b320_1$ to the PBX $e320_2$, the ATM multiplexer $c330_1$ compresses the voice data received from the PBX $b320_1$, and transmits the voice data to the ATM multiplexer $d330_2$ via the ATM network $310_1$. The ATM multiplexer $d330_2$ decompresses the voice data received, and then transmits the voice data to the PBX $e320_2$. On the other hand, as to a direction in which the voice data tends from the PBX $e320_2$ to the PBX $b320_1$, the ATM multiplexer $d330_2$ compresses the voice data received from the PBX $e320_2$, and then transmits the voice data to the ATM multiplexer $c330_1$ via the ATM network $310_1$. The ATM multiplexer $c330_1$ decompresses the voice data received, and transmits the voice data to the PBX $b320_1$.

A consideration is given to a case in which in FIG. 3A, to relay the voice call between a TEL $a340_1$ and a TEL $i340_2$ by use of a path passing through the PBX $b320_1$, the PBX $e320_2$ and a PBX $h320_3$, the ATM multiplexer $c330_1$ and the ATM multiplexer $d330_2$ perform relaying of the voice call between the PBX $b320_1$ and the PBX $e320_2$, and the ATM multiplexer $f330_3$ and the ATM multiplexer $g330_4$ perform relaying of the voice call between the PBX $e320_2$ and the PBX $h320_3$.

Here, assuming that to relay the voice call between the PBX $b320_1$ and the PBX $e320_2$, the ATM multiplexer $c330_1$ and the ATM multiplexer $d330_2$ compress and decompress the voice data, and to relay the voice call between the PBX $e320_2$ and the PBX $h320_3$, an ATM multiplexer $f330_3$ and an ATM multiplexer $g330_4$ compress and decompress the voice data, the voice data of the voice call will be subjected twice to the compression and decompression as shown in FIG. 3B. Repetition of the compression/decompression of the voice data is not desirable because deterioration in a quality of the voice data is brought about.

For this reason, in the conventional system, a PBX recognizing that the PBX itself is not at an end of a relay path, that is, that the PBX itself only relay a voice call, has instructed an ATM multiplexer connected thereto not to execute the compression/decompression of the voice call. The ATM multiplexer that received the instruction has not executed the compression/decompression of the voice data of this voice call. Thus, the compression/decompression have not been executed repeatedly.

For example, in FIG. 3A, when the voice call between the TEL $a340_1$ and the TEL $i340_2$ is relayed by use of a path passing through the PBX $b320_1$, the PBX $e320_2$ and the PBX $h320_3$, the PBX $e320_2$ accommodating none of the TEL $a340_1$ and the TEL $i340_2$ recognizes that the PBX $e320_2$ itself is not at the end of the path, that is, that the PBX $e320_2$ itself only relays the voice call. Then, the PBX $e320_2$ instructs the ATM multiplexer $d330_2$ and the ATM multiplexer $f330_3$ not to execute the compression/decompression of the voice data as to this voice call. Upon receipt of this instruction, the ATM multiplexer $d330_2$ and the ATM multiplexer $f330_3$ do not compress and decompress the voice data as to this voice call, and relay the voice data transmissively. Thus, the compression/decompression of the voice data as to this voice call is performed only once between the ATM multiplexer $c330_1$ and the ATM multiplexer $g330_4$, as shown in FIG. 3C.

SUMMARY OF THE INVENTION

The foregoing technology in which the PBX instructs the ATM multiplexer not to execute the compression/decompression of the voice data presupposes that in terms of the control not to execute the compression/decompression, the PBX and the ATM multiplexer are made based on specifications for making both of the PBX and the ATM multiplexer conformable to each other. Specifically, the PBX and the ATM multiplexer must share a protocol concerning the control not to execute the compression/decompression of the voice data.

Accordingly, the foregoing technology in which the PBX instructs the ATM multiplexer not to execute the compression/decompression of the voice data cannot be applied to a communication system using an existing PBX which does not support the protocol concerning the control not to execute the compression/decompression of the voice data. In other words, a possibility of an application of the foregoing technology depends on the PBX.

The present invention was invented in the light of the above-described circumstances, and the object of the present invention is to provide a data relay apparatus capable of controlling an execution/non-execution of a processing/restoring of data so that the processing/restoring of the data is not executed repeatedly regardless of a PBX, when a communication system is constructed by use of the data relay apparatus of the present invention.

To solve the foregoing problem, the data relay apparatus of the present invention is connected to a relay path and a communication apparatus-side path that is a path toward a communication apparatus, and relays data between the communication apparatus and the relay path.

The data relay apparatus of the present invention comprises transmission means for transmitting a specified signal to the communication apparatus-side path; detection means for detecting the specified signal from the communication apparatus-side path; and relay means for relaying the data between the communication apparatus and the relay path.

When the detection means cannot detect the specified signal, the relay means is allowed to process the data received from the communication apparatus-side path to relay the data to the relay path, and the relay means is allowed to restore the data received from the relay path to relay the data to the communication apparatus-side path. When the detection means can detect the specified signal, the relay means is allowed to relay the data received from the communication apparatus-side path to the relay path without processing the data, and the relay means is allowed to relay the data received from the relay path to the communication apparatus-side path without restoring the data.

Here, when the data is voice data, for example, the processing corresponds to a compression processing, and the restoring corresponds to a decompression processing.

In a communication system constituted by applying the plurality of data relay apparatuses of the present invention thereto, each data relay apparatus transmits a specified signal to the communication apparatus-side path. Depending on whether the detection means can detect the specified signal from the communication apparatus-side path, each data relay apparatus decides whether other data relay apparatuses exist on the communication apparatus-side path. Then, when other data relay apparatuses exist thereon, the data relay apparatus does not perform a processing/restoring of data.

Accordingly, by constituting the communication system by use of the plurality of data relay apparatus of the present invention, it is possible to control an execution/non-execution of the processing/restoring of the data so that the processing/restoring of the data is not repeatedly executed.

BRIEF DESCRIPTION OF THE DRAWINGS

FIG. 2 is a diagram for explaining a method for inserting a transmission pattern into voice data in the ATM multiplexer to which the embodiment of the present invention is applied.

DETAILED DESCRIPTION OF THE PREFERRED EMBODIMENTS

An embodiment of the present invention will next be described with an example in which the present invention is applied to an ATM multiplexer.

Figure 1:
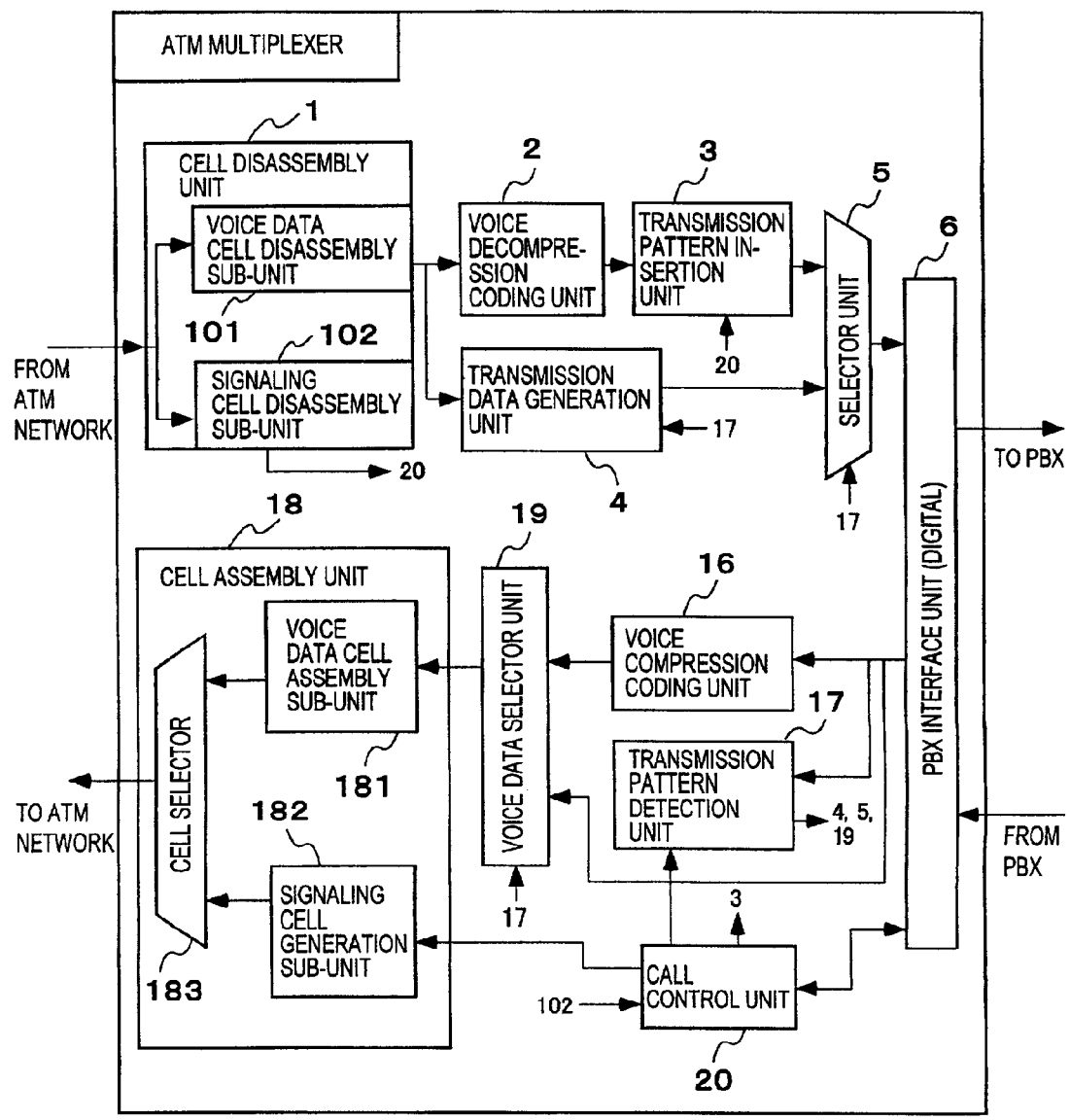
FIG. 1 is a block diagram showing a schematic constitution of an ATM multiplexer to which one embodiment of the present invention is applied.

FIG. 1 is a block diagram showing a schematic constitution of an ATM multiplexer to which an embodiment of the present invention is applied.

As shown in FIG. 1, the ATM multiplexer of this embodiment comprises a cell disassembly unit 1; a voice decompression coding unit 2; a transmission pattern insertion unit 3; a transmission data generation unit 4; a selector unit 5; a PBX interface unit 6; a voice compression coding unit 16; a transmission pattern detection unit 17; a cell assembly unit 18; a voice data selector unit 19; and a call control unit 20.

The cell disassembly unit 1 includes a voice data cell disassembly sub-unit 101 and a signaling cell disassembly sub-unit 102. The cell assembly unit 18 includes a voice data cell assembly sub-unit 181; a signaling cell generation sub-unit 182; and a cell selector 183.

Next, an operation of the ATM multiplexer having the above-described constitution will be described.

In the ATM multiplexer of this embodiment, in a normal operation performed at the start of relaying a voice call, voice data received from a path on a PBX side is compressed, and relayed to a path on an ATM network side. Voice data received from the path on the ATM network side is decompressed, and relayed to the path on the PBX side.

The operation of the ATM multiplexer of this embodiment differs between a case in which an incoming call is received from the path on the PBX side and a case in which the incoming call is received from the path on the ATM network side.

First, the operation of the case in which the incoming call is received from the path on the PBX side will be described.

In this case, call control information sent from the PBX is input to the call control unit 20 via the PBX interface unit 6. When the call control unit 20 detects the incoming call from the received call control information, the call control unit 20 sets a communication channel between the ATM multiplexer and a caller side apparatus on the pre-stage of the ATM multiplexer, which is an apparatus sending a call to the PBX, so as to interpose the PBX interface unit 6 therebetween.

The call control unit 20 sends a call to the ATM network side by use of the signaling cell generation sub-unit 182 and the signaling cell disassembly sub-unit 102, and transmits/receives a signaling signal to/from the ATM network to execute switched virtual channel (SVC) procedures. Thus, the call control unit 20 sets a virtual path/virtual channel (VP/VC) between the ATM multiplexer and a called side apparatus on the post-stage of the ATM multiplexer that is an apparatus to which the call received from the calling side apparatus on the pre-stage of the ATM multiplexer is relayed through the ATM network.

At this time, the signaling cell generation sub-unit 182 stores a signaling signal received from the call control unit 20 in a signaling cell, and transmits the signaling cell to the ATM network via the cell selector 183. On the other hand, the signaling cell disassembly sub-unit 102 fetches out the signaling signal from the signaling cell received from the ATM network, and hands over the signaling signal to the call control unit 20.

When a communication channel is set between the ATM muliplexer and the calling side apparatus on the pre-stage of the ATM multiplexer and when the VP/VC is set between the ATM multiplexer and the called side apparatus on the post-side of the ATM multiplexer, the voice compression coding unit 16 receives the voice data concerning the call via the PBX interface unit 6 from the communication channel set between the ATM multiplexer and the calling side apparatus on the pre-stage of the ATM multiplexer, and compresses and codes the voice data. The voice data cell generation sub-unit 181 receives the voice data compressed and coded by the voice compression coding unit 16 via the voice data selector 19, and stores the voice data in an ATM cell. Then, the voice data cell assembly sub-unit 181 transmits the voice data to the VP/VC set between the ATM multiplexer and the called side apparatus on the post-stage of the ATM multiplexer.

On the other hand, the voice data cell disassembly sub-unit 101 receives the ATM cell from the VP/VC set between the ATM multiplexer and the called side apparatus on the post-stage of the ATM multiplexer, and extracts the voice data from the ATM cell to hand over the voice data to the voice decompression coding unit 2. The voice decompression coding unit 2 decompresses the voice data received and transmits the decompressed voice data to the communication channel set between the ATM multiplexer and the calling side apparatus on the pre-stage of the ATM multiplexer via the transmission pattern insertion unit 3, the selector 5 and the PBX interface unit 6.

Here, when an incoming call is received from a path on the PBX side, the transmission pattern detection unit 17 and the transmission pattern insertion unit 3 operate as follows.

Specifically, when the incoming call is received from the path on the PBX side, after the transmission pattern insertion unit 3 receives a insertion instruction from the transmission pattern detection unit 17, the transmission pattern insertion unit 3 starts a processing to insert a transmission pattern into the voice data received from the voice decompression coding unit 2. The voice data into which the transmission pattern has been inserted is transmitted to the communication channel set between the calling side apparatus on the pre-stage of the ATM multiplexer and the ATM multiplexer via the selector 5 and the PBX interface unit 6.

Furthermore, when the communication channel is set between the calling side apparatus on the pre-stage of the ATM multiplexer and the ATM multiplexer and when the VP/VC is set between the called side apparatus on the post-stage of the ATM multiplexer and the ATM multiplexer, the transmission pattern detection unit 17 receives the voice data as to the call from the communication channel set between the calling side apparatus on the pre-stage of the ATM multiplexer and the ATM multiplexer, via the PBX interface unit 6. Then, the transmission pattern detection unit 17 monitors whether the transmission pattern that is a predetermined pattern is included in the voice data received. Only when the transmission pattern detection unit 17 detects the transmission pattern continuously for a certain period of time, the transmission pattern detection unit 17 instructs the transmission pattern insertion unit 3 to insert the transmission pattern to the voice data. After that, the transmission pattern detection unit 17 waits a passage of a predetermined period of time that is a period of enough time to notify the calling side apparatus on the pre-stage of the ATM multiplexer of the transmission pattern and controls each unit so that the ATM multiplexer does not perform the compression/decompression of the voice data.

To be specific, the transmission pattern detection unit 17 controls the voice data selector 19 so that the voice data received from the communication channel set between the calling side apparatus on the pre-stage of the ATM multiplexer and the ATM multiplexer via the PBX interface unit 6 is transmitted to the voice data cell assembly sub-unit 181 transmissively (without passing through the voice compression coding unit 16). Thus, the transmissive voice data is stored in the ATM cell in the voice data cell assembly sub-unit 181, and then transmitted to the VP/VC set between the called side apparatus on the post-stage of the ATM multiplexer and the ATM multiplexer via the cell selector 183.

Furthermore, the transmission pattern detection unit 17 controls the transmission data generation unit 4 so that the voice data extracted by the voice data cell disassembly sub-unit 101 is transmitted to the selector 5 transmissively. The transmission pattern detection unit 17 controls the selector 5 so as to allow the selector 5 to select the voice data from the transmission data generation unit 4 to transmit it to the PBX interface unit 6. Thus, the voice data extracted by the voice data cell disassembly sub-unit 101 is directly transmitted to the communication channel set between the caller side apparatus on the pre-stage of the ATM multiplexer and the ATM multiplexer from the PBX interface unit 6.

It should be noted that the word "transmissively" means that the voice data does not undergo the compression/decompression in the above descriptions.

Next, an operation of a case in which the incoming call is received from the path on the ATM network side will be described.

In this case, a signaling signal sent from the ATM network is extracted from the signaling cell in the signaling cell disassembly sub-unit 102, and sent to the call control unit 20. When the call control unit 20 detects the incoming call from the received signaling cell, the call control unit 20 sends a call to the ATM network side by use of the signaling cell generation sub-unit 182 and the signaling cell disassembly sub-unit 102, and sends/receives the signaling signal to/from the ATM network so as to execute SVC procedures. Thus, the VP/VC is set between the ATM multiplexer and the calling side apparatus on the pre-stage of the ATM multiplexer, which is an apparatus that sends a call to the ATM network. Furthermore, the call control unit 20 sends a call to the PBX side via the PBX interface unit 6. Thus, the communication channel is set between the ATM multiplexer and the called side apparatus on the post-stage of the ATM multiplexer that is an apparatus to which the call received from the calling side apparatus on the pre-stage of the ATM multiplexer is relayed via the PBX.

When the VP/VC is set between the ATM multiplexer and the calling side apparatus on the pre-stage of the ATM multiplexer and when the communication channel is set between the ATM multiplexer and the called side apparatus on the post-stage of the ATM multiplexer, the voice compression coding unit 16 receives the voice data concerning this call from the communication channel set between the ATM multiplexer and the called side apparatus on the post-side of the ATM multiplexer via the PBX interface unit 6, and compresses and codes the voice data. The voice data cell assembly sub-unit 181 receives the compressed and coded voice data from the voice compression coding unit 16 via the voice data selector 19, and stores the voice data in the ATM cell. Then, the voice data cell generation sub-unit 181 transmits the ATM cell storing the voice data to the VP/VC set between the ATM multiplexer and the caller side apparatus on the pre-stage of the ATM multiplexer via the cell selector 183.

On the other hand, the voice data cell disassembly sub-unit 101 extracts the voice data from the ATM cell received from the VP/VC set between the calling side apparatus on the pre-stage of the ATM multiplexer and the ATM multiplexer, and hand over the extracted voice data to the voice decompression coding unit 2. The voice decompression coding unit 2 decompresses the voice data received. The decompressed voice data is transmitted to the communication channel, which is set between the ATM multiplexer and the called side apparatus on the post-side of the ATM multiplexer, via the transmission pattern insertion unit 3, the selector 5 and the PBX interface unit 6.

Here, when the incoming call is received from the path on the ATM network side, the transmission pattern detection unit 17 and the transmission pattern insertion unit 3 operates as follows.

To be specific, in the case where the incoming call is received from the path on the ATM network side, when the VP/VC is set between the ATM multiplexer and the calling side apparatus on the pre-stage of the ATM multiplexer and when the communication channel is set between the ATM multiplexer and the called side apparatus on the post-stage of the ATM multiplexer, the transmission pattern insertion unit 3 immediately starts a processing to insert the transmission pattern into the voice data received from the voice decompression coding unit 2. The voice data into which the transmission pattern has been inserted is transmitted to the communication channel, which is set between the ATM multiplexer and the called side apparatus on the post-stage of the ATM multiplexer, via the selector 5 and the PBX interface unit 6.

When the VP/VC is set between the ATM multiplexer and the caller side apparatus on the pre-stage of the ATM multiplexer and when the communication channel is set between the ATM multiplexer and the called side apparatus on the post-stage of the ATM multiplexer, the transmission pattern detection unit 17 receives the voice data concerning this call from the communication channel, which is set between the ATM multiplexer and the called side apparatus on the post-side of the ATM multiplexer, via the PBX interface unit 6, and monitors whether a predetermined transmission pattern is included in the voice data. Only when the transmission pattern detection unit 17 detects the transmission pattern continuously for a predetermined period of time, the transmission pattern detection unit 17 controls each unit so that the ATM multiplexer does not perform the compression/decompression of the voice data.

To be concrete, the transmission pattern detection unit 17 controls the voice data selector 19 so that the voice data received from the communication channel, which is set between the called side apparatus on the post-stage of the ATM multiplexer and the ATM multiplexer, via the PBX interface unit 6 is transmitted to the voice data cell assembly sub-unit 181 transmissively (without passing through the voice compression coding unit 16). Thus, the transmissive voice data is stored in the ATM cell in the voice data cell assembly sub-unit 181, and then transmitted to the VP/VC, which is set between the calling side apparatus on the pre-stage of the ATM multiplexer and the ATM multiplexer, via the cell selector 183.

Furthermore, the transmission pattern detection unit 17 controls a transmission data generation unit 4 so that the voice data extracted by the voice data cell disassembly sub-unit 101 is directly transmitted to the selector 5 transmissively. The transmission pattern detection unit 17 controls the selector 5 so as to allow the selector 5 to select the voice data from the transmission data generation unit 4 to transmit that to the PBX interface unit 6. Thus, the voice data extracted by the voice data cell disassembly sub-unit 101 is directly transmitted, from the PBX interface unit 6 to the communication channel set between the called side apparatus on the post-stage of the ATM multiplexer and the ATM multiplexer.

The description for the operation of the ATM multiplexer of this embodiment was made as described above.

Figure 3A:
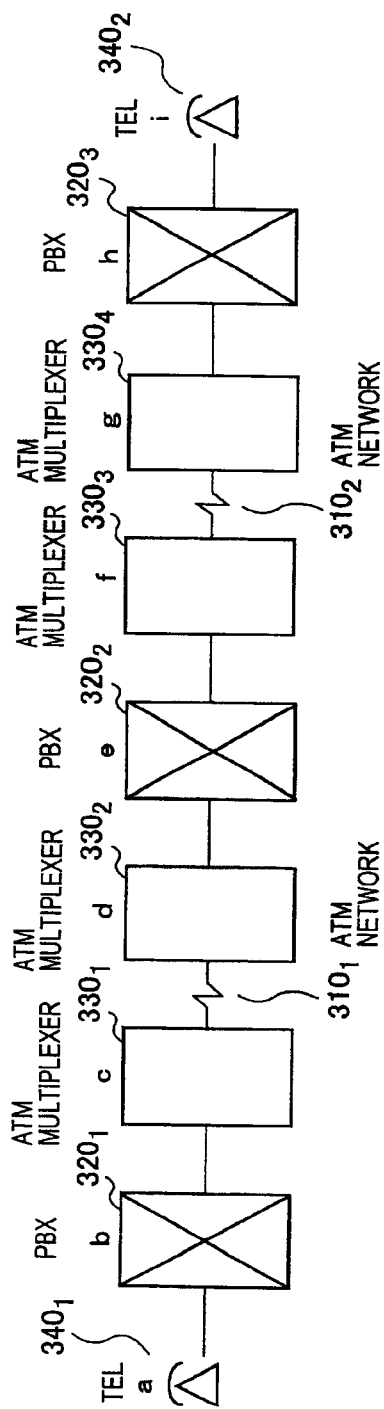
FIGS. 3A to 3C are diagrams showing a compression/decompression operation in each ATM multiplexer when the voice data on a path connecting two PBXs passing through other PBXs is relayed by use of the plurality of ATMs.
Figure 3B:
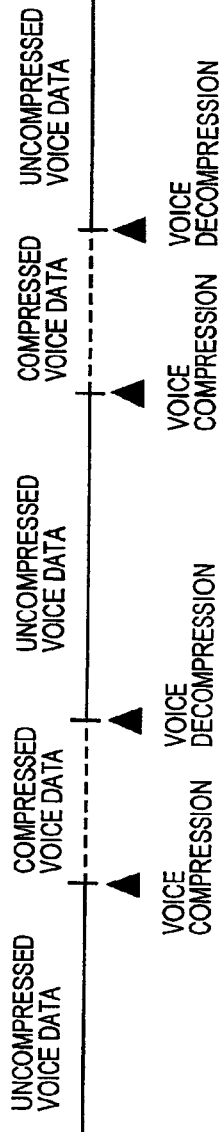

When the ATM multiplexer of this embodiment described above is applied to each of ATM multiplexers $330_1$ to $330_4$ shown in FIG. 3, an operation of each of the ATM multiplexers $330_1$ to $330_4$, in the case where a TEL $a340_1$ sends a call to a TEL $i340_2$, is as follows.

(1) ATM Multiplexer $c330_1$

The TEL $a340_1$ serves as the calling side apparatus on the pre-stage of the ATM multiplexer $c330_1$, and the ATM multiplexer $d330_2$ serves as the called side apparatus on the post-stage of the ATM multiplexer $c330_1$.

When the ATM $c330_1$ receives a call from the TEL $a340_1$ via the PBX $b320_1$, the ATM $c330_1$ sets a communication channel between the TEL $a340_1$ and itself. Moreover, the ATM multiplexer $c330_1$ sends a call to the ATM multiplexer $d330_2$ via the ATM network $310_1$, and sets a VP/VC between the ATM multiplexer $d330_2$ and itself.

Here, the ATM multiplexer $c330_1$ receives the call from the PBX side. Accordingly, after the transmission pattern insertion unit 3 of the ATM multiplexer $c330_1$ receives an insertion instruction from the transmission pattern detection unit 17, the transmission pattern insertion unit 3 starts a processing to insert the transmission pattern into the voice data decompressed by the voice decompression coding unit 2.

On the other hand, the transmission pattern detection unit 17 of the ATM multiplexer $c330_1$ receives the voice data concerning the call from the communication channel set between the caller side apparatus on the pre-stage of the ATM multiplexer $c330_1$ and the ATM multiplexer $c330_1$, and monitors whether the transmission pattern that is a predetermined pattern is included in the voice data received. In this case, since the calling side apparatus on the pre-stage of the ATM multiplexer $c330_1$ is the TEL $a340_1$, no transmission pattern is detected.

Accordingly, the transmission pattern detection unit 17 of the ATM multiplexer $c330_1$ does not control the transmission generation unit 4, the selector 5 and the voice data selector 19 so as not to execute the compression/decompression of the voice data. Thus, the ATM multiplexer $c330_1$ executes the compression/decompression operation normally. Specifically, the ATM multiplexer $c330_1$ compresses the voice data received from the communication channel set between the ATM multiplexer $c330_1$ and the TEL $a340_1$ that is the calling side apparatus on the pre-stage of the ATM multiplexer $c330_1$, and transmits the compressed voice data to the VP/VC set between the ATM multiplexer $c330_1$ and the ATM multiplexer $d330_2$ that is the called side apparatus on the post-stage of the ATM multiplexer $c330_1$. Furthermore, the ATM multiplexer $c330_1$ decompresses the voice data received from the VP/VC set between the ATM multiplexer $c330_1$ and the ATM multiplexer $d330_2$ that is the called side apparatus on the post-stage of the ATM multiplexer $c330_1$, and transmits the decompressed voice data to the communication channel set between the TEL $a340_1$ and the ATM multiplexer $c330_1$. In this case, since the transmission pattern detection unit 17 of the ATM multiplexer $c330_1$ does not send the insertion instruction to the transmission pattern insertion unit 3, no transmission pattern is inserted into the voice data decompressed by the voice decompression coding unit 2.

(2) ATM Multiplexer $d330_2$

The ATM multiplexer $c330_1$ serves as the calling side apparatus on the pre-stage of the ATM multiplexer $d330_2$, and the ATM multiplexer $f330_3$ serves as the called side apparatus on the post-stage of the ATM multiplexer $d330_2$.

When the ATM multiplexer $d330_2$ receives a call from the ATM multiplexer $c330_1$ via the ATM network $310_1$, the ATM multiplexer $d330_2$ sets the VP/VC between the ATM multiplexers $c330_1$ and $d330_2$. Furthermore, the ATM multiplexer $d330_2$ sets the communication channel between the ATM multiplexers $d330_2$ and $f330_3$ so as to interpose the PBX $e320_2$ therebetween.

Here, the ATM multiplexer $d330_2$ receives the call from the ATM network side. Accordingly, the transmission pattern insertion unit 3 of the ATM multiplexer $d330_2$ immediately starts a processing to insert the transmission pattern into the voice data decompressed by the voice decompression coding unit 2. By this processing, the transmission pattern that is a predetermined pattern is inserted into the voice data concerning the call, which has been received from the VP/VC set between the calling side apparatus on the pre-stage of the ATM multiplexer $d330_2$ and the ATM multiplexer $d330_2$, and has been decompressed by the voice decompression coding unit 2. Then, the voice data is transmitted to the communication channel, which is set between the called side apparatus on the post-stage of the ATM multiplexer $d330_2$ and the ATM multiplexer $d330_2$, via the selector 5 and the PBX interface unit 6.

On the other hand, the transmission pattern detection unit 17 of the ATM multiplexer $d330_2$ receives the voice data concerning the call from the communication channel set between the called side apparatus on the post-stage of the ATM multiplexer $d330_2$ and the ATM multiplexer $d330_2$, and monitors whether the transmission pattern that is a predetermined pattern is included in the voice data received. In this case, since the called side apparatus on the post-stage of the ATM multiplexer d$330_2$ is the ATM multiplexer f$330_3$, the transmission pattern is detected as described later.

Accordingly, the transmission pattern detection unit 17 of the ATM multiplexer d$330_2$ controls the transmission data generation unit 4, the selector 5 and the voice data selector 19 so that the compression/decompression operation for the voice data is not executed. Thus, the ATM multiplexer d$330_2$ allows the voice data concerning the call to pass therethrough without executing the compression/decompression operation for the voice data. Specifically, the ATM multiplexer d$330_2$ transmits the voice data concerning the call to the communication channel set between the ATM multiplexer d$330_2$ and the ATM multiplexer f$330_3$ that is the called side apparatus on the post-stage of the ATM multiplexer d$330_2$, without decompressing the voice data, the voice data being received from the VP/VC set between the ATM multiplexer d$330_2$ and the ATM multiplexer c$330_1$ that is the calling side apparatus on the pre-stage of the ATM multiplexer d$330_2$. Furthermore, the ATM multiplexer d$330_2$ directly transmits the voice data concerning the call to the VP/VC set between the ATM multiplexer d$330_2$ and the ATM multiplexer c$330_1$ that is the calling side apparatus on the pre-stage of the ATM multiplexer d$330_2$, without compressing the voice data, the voice data being received from the communication channel set between the ATM multiplexer d$330_2$ and the ATM multiplexer f$330_3$ that is the called side apparatus on the post-stage of the ATM multiplexer d$330_2$.

(3) ATM Multiplexer f$330_3$

The ATM multiplexer d$330_2$ serves as the calling side apparatus on the pre-stage of the ATM multiplexer f$330_3$, and the ATM multiplexer g$330_4$ serves as the called side apparatus on the post-stage of the ATM multiplexer f$330_3$.

When the ATM multiplexer f$330_3$ receives a call from the ATM multiplexer d$330_2$ via the PBX e$320_2$, the ATM f$330_3$ sets the communication channel between the ATM multiplexer d$330_2$ and itself. Moreover, the ATM multiplexer f$330_3$ sends a call to the ATM multiplexer g$330_4$ via the ATM network $310_2$. Thus, the ATM multiplexer f$330_3$ sets the VP/VC between the ATM multiplexer g$330_4$ and itself.

Here, the ATM multiplexer f$330_3$ receives the call from the PBX side. Accordingly, after the transmission pattern insertion unit 3 of the ATM multiplexer f$330_3$ receives an insertion instruction from the transmission pattern detection unit 17, the transmission pattern insertion unit 3 starts a processing to insert the transmission pattern into the voice data decompressed by the voice decompression coding unit 2.

On the other hand, the transmission pattern detection unit 17 of the ATM multiplexer f$330_3$ receives the voice data concerning the call from the communication channel set between the calling side apparatus on the pre-stage of the ATM multiplexer f$330_3$ and the ATM multiplexer f$330_3$, and monitors whether the transmission pattern that is a predetermined pattern is included in the voice data received. In this case, the calling side apparatus on the pre-stage of the ATM multiplexer f$330_3$ is the ATM multiplexer d$330_2$. As described in the foregoing item (2), until the transmission pattern detection unit 17 of the ATM multiplexer f$330_3$ detects that the transmission pattern is inserted into the voice data received from the called side apparatus on the post-stage of the ATM multiplexer d$330_2$ (ATM multiplexer f$330_3$), the ATM multiplexer d$330_2$ allows the transmission pattern to be inserted into the voice data received from the calling side apparatus on the pre-stage of the ATM multiplexer d$330_2$, and transmits this voice data to the called side apparatus on the post-stage of the ATM multiplexer d$330_2$. For this reason, the transmission pattern is detected.

Accordingly, the transmission pattern detection unit 17 of the ATM multiplexer f$330_3$ issues an insertion instruction to the transmission pattern insertion unit 3, and allows the transmission pattern insertion unit 3 to start to insert the transmission pattern into the voice data decompressed by the voice decompression coding unit 2. After a predetermined period of time has passed, the predetermined period of time being an enough time to notify the transmission pattern to the ATM multiplexer d$330_2$ that is the calling side apparatus on the pre-stage of the ATM multiplexer f$330_3$, the transmission pattern detection unit 17 of the ATM multiplexer f$330_3$ controls the transmission data generation unit 4, the selector 5 and the voice data selector 19 so as not to execute the compression/decompression operation for the voice data.

Thus, the ATM multiplexer f$330_3$ allows the voice data concerning this call to pass therethrough without executing the compression/decompression operation. Specifically, the ATM multiplexer f$330_3$ does not compress the voice data concerning the call, which is received from the communication channel set between the ATM multiplexer f$330_3$ and the ATM multiplexer d$330_2$ that is the calling side apparatus on the pre-stage of the ATM multiplexer f$330_3$, and directly transmits the voice data to the VP/VC set between the ATM multiplexer f$330_3$ and the ATM multiplexer g$330_4$ that is the called side apparatus on the post-stage of the ATM multiplexer f$330_3$. The ATM multiplexer f$330_3$ does not decompress the voice data concerning the call, which is received from the VP/VC set between the ATM multiplexer f$330_3$ and the ATM multiplexer g$330_4$ that is the called side apparatus on the post-stage of the ATM multiplexer f$330_3$, and directly transmits this voice data to the communication channel set between the ATM multiplexer f$330_3$ and the ATM multiplexer d$330_2$ that is the calling side apparatus on the pre-stage of the ATM multiplexer f$330_3$.

(4) ATM Multiplexer g$330_4$

The ATM multiplexer f$330_3$ serves as the calling side apparatus on the pre-stage of the ATM multiplexer g$330_4$, and the TEL i$340_2$ serves as the called side apparatus on the post-stage of the ATM multiplexer g$330_4$.

When the ATM multiplexer g$330_4$ receives a call from the ATM multiplexer f$330_3$ via the ATM network $310_2$, the ATM multiplexer g$330_4$ sets the VP/VC between the ATM multiplexers g$330_3$ and f$330_3$. Furthermore, the ATM multiplexer g$330_4$ sets the communication channel between the TEL i$340_2$ and itself so as to interpose the PBX h$320_3$ therebetween.

Here, the ATM multiplexer g$330_4$ receives the call from the ATM network side. Accordingly, the transmission pattern insertion unit 3 of the ATM multiplexer g$330_4$ immediately starts a processing to insert the transmission pattern into the voice data decompressed by the voice decompression coding unit 2. Thus, the transmission pattern that is a predetermined pattern is inserted into the voice data concerning the call, which has been received from the VP/VC set between the calling side apparatus on the pre-stage of the ATM multiplexer g$330_4$ and the ATM multiplexer g$330_4$, and has been decompressed by the voice decompression coding unit 2. Then, the voice data is transmitted to the communication channel, which is set between the called side apparatus on the post-stage of the ATM multiplexer g$330_4$ and the ATM multiplexer g$330_4$, via the selector 5 and the PBX interface unit 6.

On the other hand, the transmission pattern detection unit 17 of the ATM multiplexer g$330_4$ receives the voice data concerning the call from the communication channel set between the called side apparatus on the post-stage of the ATM multiplexer g$330_4$ and the ATM multiplexer g$330_4$, and monitors whether the transmission pattern that is a predetermined pattern is included in the voice data received. In this case, since the called side apparatus on the post-stage of the ATM multiplexer g$330_4$ is the TEL i$340_2$, the transmission pattern is not detected.

Accordingly, the transmission pattern detection unit 17 of the ATM multiplexer g$330_4$ does not control the transmission data generation unit 4, the selector 5 and the voice data selector 19 so as not to execute the compression/decompression operation for the voice data. Thus, the ATM multiplexer g$330_4$ normally executes the compression/decompression operation for this voice data. Specifically, the ATM multiplexer g$330_4$ decompresses the voice data received from the VP/VC set between the ATM multiplexer g$330_4$ and the ATM multiplexer f$330_3$ that is the calling side apparatus on the pre-stage of the ATM multiplexer g$330_4$, and transmits the decompressed voice data to the communication channel set between the ATM multiplexer g$330_4$ and the TEL i$340_2$ that is the called side apparatus on the post-stage of the ATM multiplexer g$330_4$. Furthermore, the ATM multiplexer g$330_4$ compresses the voice data received from the communication channel set between the ATM multiplexer g$330_4$ and the TEL i$340_2$ that is the called side apparatus on the post-stage of the ATM multiplexer g$330_4$, and transmits the compressed voice data to the VP/VC set between the ATM multiplexer g$330_4$ and the ATM multiplexer f$330_3$ that is the calling side apparatus on the pre-stage of the ATM multiplexer g$330_4$.

Figure 3C:
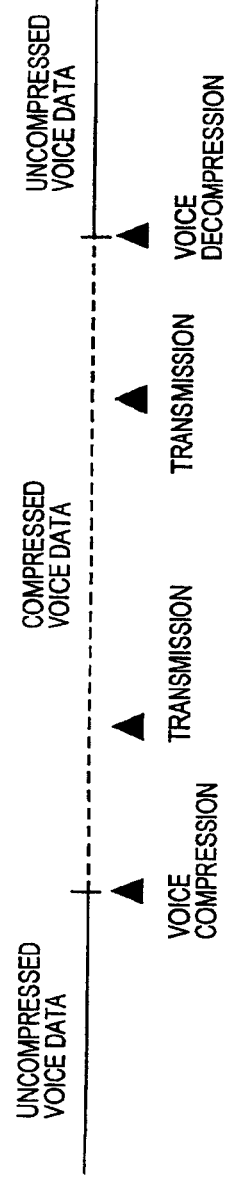

As a result, the ATM multiplexers d$330_2$ and f$330_3$ do not execute the compression/decompression operation for the call, and relay the voice data transmissively. Consequently, as shown in FIG. 3C, when the call between the TEL a$340_1$ and the TEL i$340_2$ is relayed by the path passing through the PBX b$320_1$, PBX e$320_2$ and PBX h$320_3$, the compression/decompression of the voice data as to the call will be executed only once between the ATM multiplexers c$330_1$ and g$330_4$.

By the way, as the transmission pattern used in this embodiment, for example, the one is used obtained by performing a self-synchronization scramble for a 8-bit pattern composed of "01010101" by use of a generation polynomial expressed as $1+X^{-4}+X^{-7}$, thus converting it to a random pattern.

In this embodiment, when the interface between the ATM multiplexer and the PBX is a 2048 kbit/s interface recommended as G.704 of International Telecommunication Union-Telecommunication Standardization Sector (ITU-T), as shown in FIG. 2, a multiframe 2001 composed of six frames 2002 is used to send/receive voice data between the ATM multiplexer and the PBX. Each frame 2002 consists of thirty-two time slots 2003. Moreover, 8-bit data is stored in each time slot 2003. In this case, the insertion of the transmission pattern into the voice data can be performed by assigning the eighth bit (bit 8) in the time slot 2003 for voice in the sixth frame (frame No. 6) of each multiframe 2001 for the transmission of the transmission pattern.

Since the seventeenth time slot (TS No. 16) 2003 in this case is an undefined time slot, this time slot may be assigned for the communication of the transmission pattern in a system in which data concerning this time slot is assured to be transmissively relayed by the PBX.

As shown in FIG. 2, when the insertion of the transmission pattern into the voice data is performed, the detection of the transmission pattern by the transmission pattern detection unit 17 for a predetermined period of time can be achieved by use of a synchronous detection method by front protection eight stages and rear protection seven stages as shown in the below.

Specifically, while shifting the frame 2002 one by one, for example, for each 20 ms, the transmission pattern is detected. Thus, the multiframe 2001 including the transmission pattern is detected. If the multiframe 2001 can be detected, when the transmission pattern can be continuously detected from a predetermined frame 2002 in subsequent seven multiframes 2001, it is decided that the transmission pattern was detected continuously for a predetermined period of time. Thereafter, on the other hand, when the transmission pattern cannot be detected from the predetermined frame 2002 in subsequent eight multiframes 2001, it is decided that the transmission pattern could not be detected continuously for a predetermined period of time.

The embodiment of the present invention was described as above.

In this embodiment, the execution of the compression/decompression for the voice is controlled by deciding based on the sending/receiving of the transmission pattern between the ATM multiplexers whether the ATM multiplexer itself is the one located on an end of the relay path. Here, the transmission pattern is included in the voice data assured to be relayed transmissively in the PBX, and sent/received between the ATM multiplexers. Accordingly, according to this embodiment, it is possible to control the execution/non-execution of the compression/decompression for the voice data without depending on the PBX so that the compression/decompression of the voice data is not repeatedly performed.

Furthermore, in the ATM multiplexer of this embodiment, in the case where an incoming call is received from the path on the ATM network side, when the VP/VC is set between the ATM multiplexer itself and the calling side apparatus on the pre-stage of the ATM multiplexer and when the communication channel is set between the ATM multiplexer itself and the called side apparatus on the post-stage of the ATM multiplexer, the transmission pattern insertion unit 3 immediately starts a processing to insert the transmission pattern into the voice data received from the voice decompression coding unit 2. When the transmission pattern detection unit 17 detects the transmission pattern, the transmission pattern detection unit 17 controls each unit so that the expression/decompression of the voice data is not executed.

On the other hand, when the incoming call is received from the path on the PBX network side, after the transmission pattern is detected by the transmission pattern detection unit 17, the transmission pattern insertion unit 3 starts the processing to insert the transmission pattern into the voice data received from the voice decompression coding unit 2. When the transmission pattern detection unit 17 detects the transmission pattern, the transmission pattern detection unit 17 issues an insertion instruction to the transmission pattern insertion unit 3. Then, after passage of a predetermined period of time, the transmission pattern detection unit 17 controls each unit so as not to execute the compression/decompression of the voice data.

With the above-described processing, in the ATM multiplexers connected to each other so as to interpose the PBXs therebetween, it is possible to surely send/receive the transmission pattern between the ATM multiplexers before the execution of the compression/decompression for voice data is switched to the non-execution thereof.

It should be noted that the present invention is not limited to the foregoing embodiment, and various modifications and alternations can be made therein without departing from scope of the invention.

For example, the foregoing embodiment was described on the assumption that the ATM multiplexer is connected to other ATM multiplexers so as to interpose the ATM network therebetween. However, if there is a possibility that a certain ATM multiplexer is connected to an ATM terminal apparatus other than ATM multiplexers via the ATM network, a transmission pattern from the ATM network may be detected by transmitting the transmission pattern not only to the PBX side but also to the ATM network side.

In this case, when the transmission pattern could be detected from both of the PBX side and the ATM network side, or when the transmission pattern could not be detected from any of the PBX side and the ATM network side, the voice data may be satisfactorily passed through the ATM multiplexer without being compressed/decompressed. Then, when the transmission pattern could be detected from any one of the PBX side and the ATM network side, the compression/decompression of the voice data may be executed so that the voice data received from the side in which the transmission pattern could be detected may be decompressed and relayed to the side in which the transmission pattern could not be detected; and the voice data received from the side in which the transmission pattern could not be detected may be compressed and relayed to the side in which the transmission pattern could be detected.

Moreover, the present invention can be applied to not only a case where relaying of the voice data is performed while executing the compression/decompression of the voice data, but also a case where relaying of data is performed while executing any processing/restoring of the data, such as compression/decompression of image data and coding/decoding of various kinds of data. Moreover, the present invention is not limited to the ATM multiplexer. The present invention can be widely applied to a relay apparatus which processes/restores data to relay it. For example, technical idea entirely identical to the present invention can be applied also to general multiplexers having a compression/decompression function for data, which is connected to exclusive lines to be used, IP multiplexers having a compression/decompression function for data, which is connected to IP (Internet Protocol) network, and the like.

As described above, according to the present invention, in case that a communication system is constructed by use of a plurality of data relay apparatuses of the present invention, it is possible to control the execution/non-execution of the compression/decompression for the data without depending on the PBX so that the compression/decompression of the data is not executed repeatedly.

What is claimed is:

1. A data relay apparatus connected to a relay path and a communication apparatus-side path Which is a path toward a communication apparatus, the data relay apparatus relaying data between said communication apparatus side path and said relay path, comprising:

detection means for detecting first specified signal which is transmitted by another data relay apparatus from said communication apparatus-side path; and relay means for encoding data received from said communication apparatus-side path to relay the data thus encoded to said relay path, and for decoding data received from said relay path to relay the data thus decoded to said communication apparatus-side path, when said detection means cannot detect said first specified signal, and for relaying data received from said communication apparatus-side path to said relay path without encoding the data, and for relaying data received from said relay path to said communication apparatus-side path without decoding the data, when said detection means can detect the first specified signal.

2. The data relay apparatus according to claim 1, further comprising:

transmission means for immediately starting to transmit a second specified signal to said communication apparatus-side path when a call is received from said relay path by said data relay apparatus, and starting to transmit said second specified signal to said communication apparatus-side path after said detection means detects said first specified signal when a call is received from said communication apparatus-side path by said data relay apparatus, wherein said relay means immediately relays the data received from said communication apparatus-side path to said relay path without encoding the data and relays the data received from said relay path to said communication apparatus-side path without decoding the data, after said detection means detects said first specified signal, when a call is received from said relay path by said data relay apparatus, and said relay means relays the data received from said communication apparatus-aide path to said relay path without encoding the data, and relays the data received from said relay path to said communication apparatus-side path without decoding the data, after passage of a predetermined period of time after said detection means detects said first specified signal, when a call is received from said communication apparatus-side path by said data relay apparatus.

3. The data relay apparatus according to claim 1, wherein said communication apparatus-side path is a communication channel for data sending/receiving, to/from a PBX (private branch exchange).

4. The data relay apparatus according to claim 1, wherein said relay path is a VP/VC (Virtual Path/Virtual Channel) set on an ATM (Asynchronous Transfer Mode) network.

5. The data relay apparatus according to claim 1, wherein said data is voice data, and said encoding is a compression processing of said voice data, and said decoding is a decompression processing of said voice data.

6. A method of encoding/decoding data in a data relay apparatus connected to a relay path and a communication apparatus-side path which is a path toward a communication apparatus, the data relay apparatus relaying the data between said communication apparatus-side path and said relay path, wherein said data relay apparatus is allowed to executer;

a process for detecting a first specified signal which is transmitted by another data relay apparatus from said communication apparatus-side path;

a process for transmitting a second specified signal to said communication apparatus-side path; and a process for encoding data received from said communication apparatus-side path to relay the thus encoded data to said relay path, and for decoding data received from said relay path to relay the data thus decoded to said communication apparatus-side path, when said first, specified signal cannot be detected, and for relaying data received from said communication apparatus-side path to said relay path without encoding the data, and relaying data received from said relay path to said communication apparatus-side path without decoding the data, when said first specified signal can be detected.

* * * * *